US012397353B2

(12) United States Patent
Leard et al.

(10) Patent No.: US 12,397,353 B2
(45) Date of Patent: Aug. 26, 2025

(54) ADDITIVE MANUFACTURING WITH PHOTO-ACOUSTIC TOMOGRAPHY DEFECT TESTING

(71) Applicant: Seurat Technologies, Inc., Mountain View, CA (US)

(72) Inventors: Francis L. Leard, Sudbury, MA (US); James A. DeMuth, Woburn, MA (US); Andrew J. Bayramian, Marblehead, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 851 days.

(21) Appl. No.: 17/343,500

(22) Filed: Jun. 9, 2021

(65) Prior Publication Data

US 2021/0379670 A1 Dec. 9, 2021

Related U.S. Application Data

(60) Provisional application No. 63/036,900, filed on Jun. 9, 2020.

(51) Int. Cl.
*B22F 12/90* (2021.01)
*B22F 10/28* (2021.01)
(Continued)

(52) U.S. Cl.
CPC ............ *B22F 12/90* (2021.01); *B22F 10/28* (2021.01); *B22F 10/80* (2021.01); *B22F 12/41* (2021.01);
(Continued)

(58) Field of Classification Search
CPC .......... B22F 12/90; B22F 12/45; B22F 12/41; B22F 10/80; B22F 10/28; B33Y 10/00;
(Continued)

(56) References Cited

U.S. PATENT DOCUMENTS 7,262,861 B1 8/2007 Pepper et al.
12,146,861 B2 * 11/2024 Leard ................. G01N 29/0672
(Continued)

FOREIGN PATENT DOCUMENTS

CA 2948255 A1 * 5/2017 ............. B22F 10/28
DE 102016115241 A1 * 3/2017 ............. B22F 3/1055
WO WO-2017129294 A1 * 8/2017 ............. B22F 10/20

OTHER PUBLICATIONS

Translation DE 102016115241 (Year: 2017).*
(Continued)

*Primary Examiner* — Jacques M Saint Surin
(74) *Attorney, Agent, or Firm* — David R. Stevens; Stevens Law Group

(57) ABSTRACT

An additive manufacturing method supporting layer by layer testing includes a layer test including generating a hammer beam using laser light having a first wavelength, generating a read-out beam using laser light having a second wavelength, directing the generated hammer beam toward a first layer on a part to provide an acoustic hammer pulse that induces surface movement of the part, and reading the surface movement of the part using the read-out beam directed to a second position on the part. Layers can be added and the layer test repeated.

14 Claims, 9 Drawing Sheets

(51) Int. Cl.
  *B22F 10/80*   (2021.01)
  *B22F 12/41*   (2021.01)
  *B22F 12/45*   (2021.01)
  *B23K 26/03*   (2006.01)
  *B23K 26/342*  (2014.01)
  *B33Y 10/00*   (2015.01)
  *B33Y 30/00*   (2015.01)
  *B33Y 50/00*   (2015.01)
  *G01B 11/06*   (2006.01)
  *G01B 11/24*   (2006.01)
  *G01N 29/04*   (2006.01)
  *G01N 29/24*   (2006.01)

(52) U.S. Cl.
  CPC ............ *B22F 12/45* (2021.01); *B23K 26/032* (2013.01); *B23K 26/342* (2015.10); *B33Y 10/00* (2014.12); *B33Y 30/00* (2014.12); *B33Y 50/00* (2014.12); *G01B 11/0666* (2013.01); *G01B 11/2441* (2013.01); *G01N 29/043* (2013.01); *G01N 29/045* (2013.01); *G01N 29/2418* (2013.01); *G01N 2291/0289* (2013.01)

(58) Field of Classification Search
  CPC ...... B33Y 30/00; B33Y 50/00; B23K 26/342; B23K 26/032; B01N 29/045; B01N 29/2418; B01N 29/0289; B01N 29/043; G01B 11/0666
  USPC .......................................................... 73/643
  See application file for complete search history.

(56) References Cited

U.S. PATENT DOCUMENTS

| | | |
|---|---|---|
| 2006/0182155 A1 | 8/2006 | Windpassinger et al. |
| 2009/0152771 A1 | 6/2009 | Philippi et al. |
| 2013/0128284 A1 | 5/2013 | Steffey et al. |
| 2016/0136731 A1 | 5/2016 | McMurtry et al. |
| 2017/0120518 A1* | 5/2017 | DeMuth ............... B23K 26/703 |
| 2017/0292922 A1 | 10/2017 | Woods et al. |
| 2018/0194064 A1* | 7/2018 | Chen .................... B33Y 50/02 |
| 2018/0326663 A1* | 11/2018 | DeMuth ................ B29C 64/153 |
| 2018/0326664 A1* | 11/2018 | DeMuth .................. B22F 12/49 |
| 2022/0347929 A1* | 11/2022 | Delrot ................... B33Y 10/00 |

OTHER PUBLICATIONS

Translation WO 2017129294 (Year: 2017).*

Stratoudaki, et al. "Laser induced phased arrays for remote ultrasonic imaging of additive manufactured components." 57th Annual Conference of the British Institute of Non-Destructive Testing, NDT 2018. Sep. 10, 2018. Abstract, p. 4 para 5; p. 5 para 1-2; p. 6 para 1: p. 7 para 1; Figure 1; Figure 2; Figure 3.

Tobias, et al. "Single-shot areal profilometry: towards real-time surface quality control in additive manufacturing." Advances in Manufacturing Technology XXXII. Aug. 29, 2018. Abstract, p. 2 para 3; p. 3 para 3-4; p. 4 para 2, Figure 1; Figure 2; Figure 3; Figure 4.

* cited by examiner

ADDITIVE MANUFACTURING WITH PHOTO-ACOUSTIC TOMOGRAPHY DEFECT TESTING

CROSS-REFERENCE TO RELATED PATENT APPLICATION

The present disclosure is part of a non-provisional patent application claiming the priority benefit of U.S. Patent Application No. 63/036,900, filed on Jun. 9, 2020, which is incorporated by reference in its entirety.

TECHNICAL FIELD

The present disclosure generally relates to a system and method for improved additive manufacturing that allows for defect testing of parts using photo-acoustic tomography. In one embodiment, a laser pulse is used to generate an acoustic pulse and an image based interferogram is used to detect resultant surface oscillations.

BACKGROUND

Traditional component machining often relies on removal of material by drilling, cutting, or grinding to form a part. In contrast, additive manufacturing, also referred to as 3D printing, typically involves sequential layer by layer addition of material to build a part. Beginning with a 3D computer model, an additive manufacturing system can be used to create complex parts from a wide variety of materials. However, because of the complexity of the additive manufacturing process, many parts can include defects or voids that render the finished part unusable.

Non-destructive testing of industrial parts to determine sub-surface defects, voids, or cavities using acoustic methods is available. For example, an array of acoustic transducers can positioned on one or more surfaces of the Part Under Test (PUT). A short pulse laser (i.e. a hammer or ping pulse) is directed incident onto the surface of the PUT to locally heat the surface of the PUT during the pulse width of the laser pulse. This launches an acoustic pulse into the PUT as a result of differential heating, plasma generation or local expansion that interacts with the volume of the PUT. Reflection and refraction of this pulse in the PUT's volume depends on its density function, with defects, cavities, or voids causing internal reflections and additional scattering. Such defects can be identified and their position and size determined using tomographical scattering analysis of data from the array of acoustical transducers.

In some non-destructive photo-acoustic tomography testing systems, the array of acoustic transducers can be replaced or supplemented by use of a read-out laser beam. A laser pair (read-out and hammer) impinges onto the PUT with a hammer pulse width typically selected to be in the pico-second regime while the read-out is microsecond regime. The acoustic response is launched, causing the surfaces of the PUT to minutely move. This motion causes a phase modulation on the read-out beam which can be detected by taking the reflection of the read-out beam and processing it through a Michelson interferometer. The phase information in time is processed using acoustical tomographical algorithms to reconstruct the PUT volume and identify defects. While effective, such systems are complex and expensive to operate, and can require substantial time to scan a part.

SUMMARY

A part defect testing method includes the steps of generating a hammer beam using laser light having a first wavelength. A read-out beam using laser light having a second wavelength is also generated. The generated hammer beam is directed toward a first position on a part to provide an acoustic hammer pulse that induces surface movement of the part. The surface movement of the part is read using the read-out beam directed to a second position on the part and an areal camera arranged to produce an interferogram.

In some embodiments multiple hammer beams are used.

In some embodiments multiple readout beams are used.

In some embodiments timing of hammer and readout beam pulse length is adjustable.

In some embodiments at least one of the hammer and readout beams are arranged in a two dimensional pattern.

In some embodiments size of at least one of the hammer and readout beams is adjustable.

In other embodiments a part defect testing system includes one or more sources emitting one or more wavelengths of laser light. A spatial light modulator is configured to provide a pixel image including at least one pixel that is a hammer beam containing one or more wavelengths and multiple pixels that are multiple read-out beams using laser light containing one or more wavelengths. An image relay is provided for directing the hammer beam toward a first position on a part to provide an acoustic hammer pulse that induces surface movement of the part. An areal camera is arranged to produce an interferogram reading the surface movement of the part using the read-out beams directed to a second position on the part.

In some embodiments the spatial light modulator includes a transmissive spatial light modulator.

In some embodiments the spatial light modulator includes a reflective spatial light modulator.

In some embodiments the spatial light modulator includes a transmissive spatial light modulator that further comprises an optically addressed light valve.

In other embodiments a surface profiling method for a part includes the steps of providing interferometric imaging analysis assembly having a reflective phase light valve to impose spatial phase onto a reference beam. Laser read-out beams can be generated and directed toward the part. Using an areal camera, an interferogram can be produced, along with associated distance measurements.

In other embodiments a part defect testing method includes generating a hammer beam using laser light having a first polarization. A read-out beam using laser light having a second polarization is also generated. The generated hammer beam is directed toward a position on the part to provide an acoustic hammer pulse that induces surface movement of the part. The hammer and read-out beam can be combined. Surface movement of the part is read using the combined hammer and read-out beam directed to the position on the part. An areal camera can be positioned and arranged to produce an interferogram.

In other embodiments a part defect testing method includes generating a hammer beam using laser light having a first wavelength. A read-out beam using laser light having a second wavelength is also generated. The generated hammer beam is directed toward a first position on the part to provide a volumetric acoustic hammer pulse that induces surface movement of the part. The surface movement of the part is read using the read-out beam directed to a second position on the part and an areal camera arranged to produce an interferogram. The interferogram can be further processed with via tomographical algorithms to derive volumetric defects locations and structure.

In other embodiments a part defect testing system includes a hammer beam system that provides laser light having a first wavelength. A read-out beam system provides laser light having a second wavelength. A control system is used to direct the generated hammer beam laser light toward a first position on a part to provide an acoustic hammer pulse that induces surface movement of the part. An areal camera is arranged to produce an interferogram derived from reading surface movement of the part using the read-out beam directed to a second position on the part.

In other embodiments, an additive manufacturing method supporting layer by layer testing includes a layer test including generating a hammer beam using laser light having a first wavelength, generating a read-out beam using laser light having a second wavelength, directing the generated hammer beam toward a first layer on a part to provide an acoustic hammer pulse that induces surface movement of the part, and reading the surface movement of the part using the read-out beam directed to a second position on the part. Layers can be added and the layer test repeated.

In some embodiments, the additive manufacturing method further uses a separate additive writing system and laser ultrasonic imaging system (LUIS).

In some embodiments, the additive manufacturing method supports layer by layer testing with an additive writing system that shares at least some laser light beams with a laser ultrasonic imaging system (LUIS).

In some embodiments, the additive manufacturing method uses an additive manufacturing system that supports realtime modifications to operation based on information from one or more layer tests.

In some embodiments, the additive manufacturing method uses an additive manufacturing system that identifies sub-surface defects using a layer test.

In some embodiments, the additive manufacturing method uses an additive manufacturing system that maps surface topography using the layer test.

In some embodiments, the additive manufacturing method uses an additive manufacturing system that simultaneously identifies sub-surface defects and maps surface topography using the layer test.

In some embodiments, the additive manufacturing method uses an additive manufacturing system that corrects defects based on information from one or more layer tests.

In some embodiments, the additive manufacturing method uses an additive manufacturing system that corrects defects based on information from one or more layer tests and using the hammer beam to direct ultrasound energy into a melt pool to control at least one of grain size and grain distribution.

In another embodiment, an additive manufacturing system has an addressable light patterning unit to receive a light beam and emit light as two-dimensional patterned beam. A laser ultrasonic imaging system (LUIS) that generates a hammer beam using laser light having a first wavelength and a read-out beam using laser light having a second wavelength is also provided. An image relay can receive the two-dimensional patterned beam and focus it as a two-dimensional image on a powder bed and also receive the hammer and read-out beams and direct it toward the powder bed.

In some embodiments, the addressable light patterning unit comprises of a transmissive spatial light modulator.

In some embodiments, the addressable light patterning unit comprises a reflective spatial light modulator.

In some embodiments, the addressable light patterning unit modulator includes an optically addressed light valve.

In another embodiment, an additive manufacturing system includes a beam patterning unit to generate a two-dimensional patterned laser beam from a laser beam and a plurality of beam switching units to direct two-dimensional patterned energy beams. A plurality of beam steering units can receive and direct the two-dimensional patterned laser beams. A laser ultrasonic imaging system (LUIS) that generates a hammer beam using laser light having a first wavelength and a read-out beam using laser light having a second wavelength is also used, with at least one powder bed arranged to receive at least a portion of the directed two-dimensional patterned laser beam from at least one of the plurality of energy steering units and also receive the hammer and read-out beams.

In another embodiment, an additive manufacturing system includes an additive writing system capable of forming a part; and a laser ultrasonic imaging system (LUIS) that generates a hammer beam using laser light having a first wavelength and a read-out beam using laser light having a second wavelength and directs the generated beams against the part.

In another embodiment, an additive manufacturing method that supports surface profiling for a part, includes a steps of adding a layer that defines at least a portion of a part using an additive writing system and providing interferometric imaging analysis assembly having a reflective phase light valve to impose spatial phase onto a reference beam. Laser read-out beams are generated and directed toward the part and an areal camera is arranged to produce an interferogram and associated distance measurements.

In another embodiment, an additive manufacturing method includes adding a layer that defines at least a portion of a part using an additive writing system. A hammer beam using laser light having a first polarization is generated, along with a a read-out beam using laser light having a second polarization. The generated hammer beam is directed toward a position on the layer to provide an acoustic hammer pulse that induces surface movement of the part. The hammer and read-out beam can be combined, and the surface movement of the part read using the combined hammer and read-out beam directed to the position on the part and an areal camera arranged to produce an interferogram.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1A:
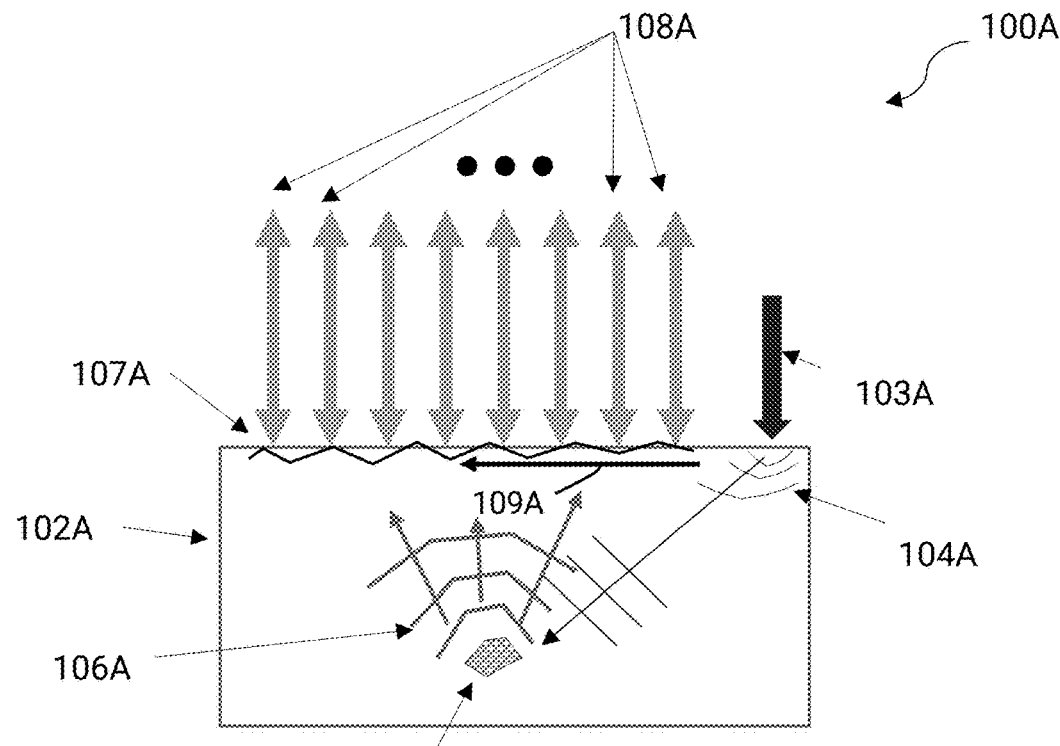
FIG. 1A illustrates operation of an embodiment of a part defect testing system that uses photo-acoustic tomography.

FIG. 1A illustrates operation of an embodiment of a part defect testing system 100A that uses photo-acoustic tomography. A Part Under Test (PUT) 102A is shown in cross-section to illustrate use of parallel readout channels to enable volumetric analysis of solid structures and identify defects. In this example, a singular laser hammer channel 103A is used in conjunctions with a multitude of read-out channels 108A. The hammer channel 103A strikes the PUT 102A and initiates an acoustic signal 104A at the site where it is imaged. This acoustic signal 104A travels volumetrically inside the PUT and encounters a defect 105A along a path. The defect 105A responds by reflecting an acoustic signal 106A which travels volumetrically back to a surface 107A of the PUT 102A and causes surface movement. Alternatively, or in addition, a surface wave 109A launched by the hammer channel 103A can be used to provide surface profiling. In effect, the surface wave will be attenuated and dispersed if the surface topology 107A is not smooth. The read-out channels 104A can sense the surface topology as a rapid change in surface height with a temporal signature different than bulk acoustic waves. By analyzing temporal as well as spatial information, this surface response can be ascertained and captured. Other types of topological recovery can also be used for part analysis, including Moire (moving patterns) in which hammer(s) can be used to accentuate surface defects. Whether bulk or acoustic waves are measured, each readout channel 108A has a unique and different phase change imposed upon it via the undulation of the surface as a response to the defect acoustical response or surface irregularities. The phase encoded readout channel 108A can be analyzed, phase recovered by an interferometer or other instrument, and defects or surface irregularities located and measured.

Figure 1B:
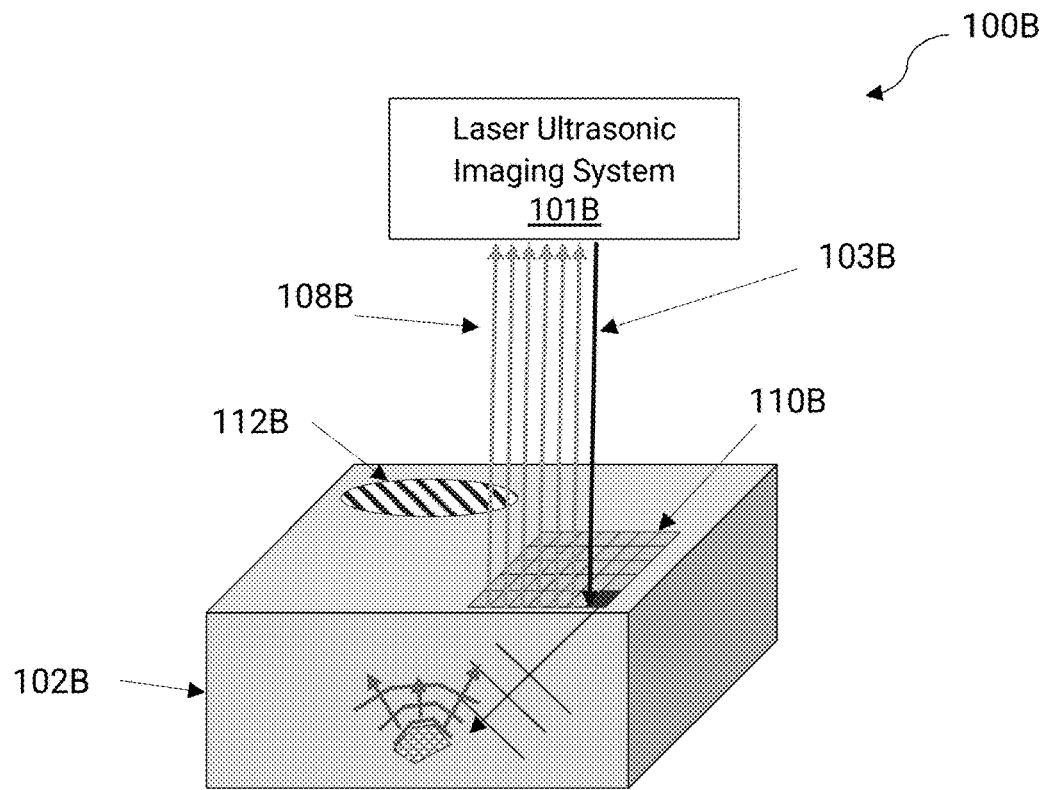
FIG. 1B illustrates in perspective view other aspects of a system such as described with respect to FIG. 1A.

FIG. 1B illustrates in perspective view other aspects of a system such as described with respect to FIG. 1A. In one embodiment, distribution of multiple read-out 108B and hammer channels 103B can be directed by a Laser Ultrasonic Imaging System (LUIS) 101B toward a PUT 102B in various desired arrangements, including an illustrated rectangular two-dimensional arrays 110B. Alternative array patterns such as ovoid pattern 112B can also used, as well as linear arrays, sparse arrays with non-adjacent read-out channels, semi-random or random read-out channel distribution, and uniform or non-uniform spacing of read-out channels. Temporal changes in position of read-out and hammer channels can also be used, with changes in laser intensity, direction, or laser pulse timing over time being possible.

In effect, the LUIS 101B allows for volumetric imaging of internal and external density and directional elasticity tensors throughout a part by using optically induced ultrasonic volume and surface energy to tomographic reconstruct the part's volume using surface scanning of the injection response. The injection point and the probe points can be part of a projected image controlled by one or more Spatial Light Modulator (SLM) such as an Optically Addressed Light Valve (OALV), a micro mirror array, a thermally based resonant light valve, a phase change based light valve, a Liquid Crystal Display (LCD), a Liquid Crystal Module (LCM), or the like. In such an embodiment, one pixel within the SLM can act as a excite (injection/hammer) channel while the rest of the SLM directs a read-out imaging beam off the area of interest which is modulated by the volumetric response to the injection channel. The read-out image goes into an imaging interferometer that includes a high-speed camera that can detect changes in intensity across the ultrasonic bandwidth. The location of the injection and read-out channels can be changed so that the injection point can be dynamically changed (scanned) without any physical motion while maintaining the same probe area. The part under test is then scanned through motion of the SLM position to a new probe area and the process is repeated. The data can be processed for defect detection using available bulk monitoring tomographic algorithms and techniques.

In some embodiments, operation of the LUIS is enabled by use of image-wise method for both the hammer channel and the read-out channel. Using an image relay from the Part Under Test (PUT) 102A, the image of the part can be transferred back from the part and into an image wise Michelson interferometer from which an image is captured onto a high speed camera or photodiode/photodetector array that can detect the variation in the interferogram from PUT's response to vibrational/ultrasonic/phonon waves launched into it by the hammer channel and via the read-out channels. High-speed cameras are used to recover and sense the areal acoustical response captured in the areal readout channels. Because of the inherent parallelism of image capture processing, the described testing can be quickly conducted.

In one embodiment, the hammer channel impulse signal could be transmitted through a SLM or be directed along an alternate path. The hammer channel signal can be as short as femtoseconds in length, or as long as microseconds. An image relay from the PUT can be evaluated in the image-wise Michaelson interferometer could be a evaluating a small "tile" section of the part at an instant, or it could go through a beam expansion to evaluate the entire part at once.

In some embodiments, a patterned light laser source composed of a short-pulsed laser source (hammer) at wavelength 1 ($\lambda 1$) and a longer pulsed laser source (read-out) at wavelength 2 ($\lambda 2$) can be used. The patterned light is imaged relay to the PUT where one channel or pixel is the hammer channel while all the other are the readout channels. The reflected light that carries the surface oscillation produced as a PUT response to the hammer channel is imaged relay back to a Michaelson where an interferogram is produced and detected by a high frame camera (>100K frames/sec). The read-out channels (now pixels in the reflected image) are all modulated by PUT surface that is oscillating at ultra-sonic frequencies (>100 kHz). Using images seen without any hammer (reference image), the effect of the ultrasonic field can be seen within each pixel of the readout image. Each read-out channel/pixel then becomes a detection channel. Moreover, since each read-out channel is now displaced from being axial with the hammer channel, higher volumetric resolution can be automatically attained. If the PUT is larger than the project image, the entire part can be scanned by moving the part beneath the projection optics or the projection optics above the PUT.

In some embodiments, the hammer channel can be selected to be any pixel with the image by changing which pixel is activated. Advantageously, volume discontinuities/inhomogeneities and Signal to Noise Ratio (SNR) ratio goes up with higher number of potential locations for the hammer channel. This increase in SNR has a direct correlation to how deep the system can resolve into a PUT. Additionally, this allows the PUT to be stressed (thermal, mechanical, operational) while being monitored, so that dynamic changes of the PUT's characteristics can be measured.

In another embodiment, multiple hammers at multiple channels can be used within the image. This would be helpful in improving the resolution that the system can measure by bathing the PUT and its inhomogeneities with multiple hammers simultaneously. Additionally, since the frequency bandwidth of the launched ultra-sound is directly related to hammer intensity, applying varying strength hammer channels can more accurately tailor the launched ultra-sound into the PUT for further defect resolution in size as well as its location in the PUT's volume. Additionally, since the hammer location can be moved singularly or in concert with other channels, a defect can be detected and then probed for better resolution of its structure and make-up.

The hammer or read-out channels can be shaped and do not need to conform to any specific shape and that these shapes for either hammer (singular or multiples) or read-out can be static or in motion across any one projected image. This allows for better control on how the ultra-sound is tailored as it traverses the PUT's volume and how it can read-out. The read-out channels can also be varied in strength to help tailor the pick-up response function. This aspect is of particular use if there are known impedance mismatches in the volume (which would cause higher or lower reflection and scattering). This aspect of gray scale coupling in both launch and read-out makes this system extremely adaptable for the variances seen in metal AM and in standard part assemblies.

Figure 1C:
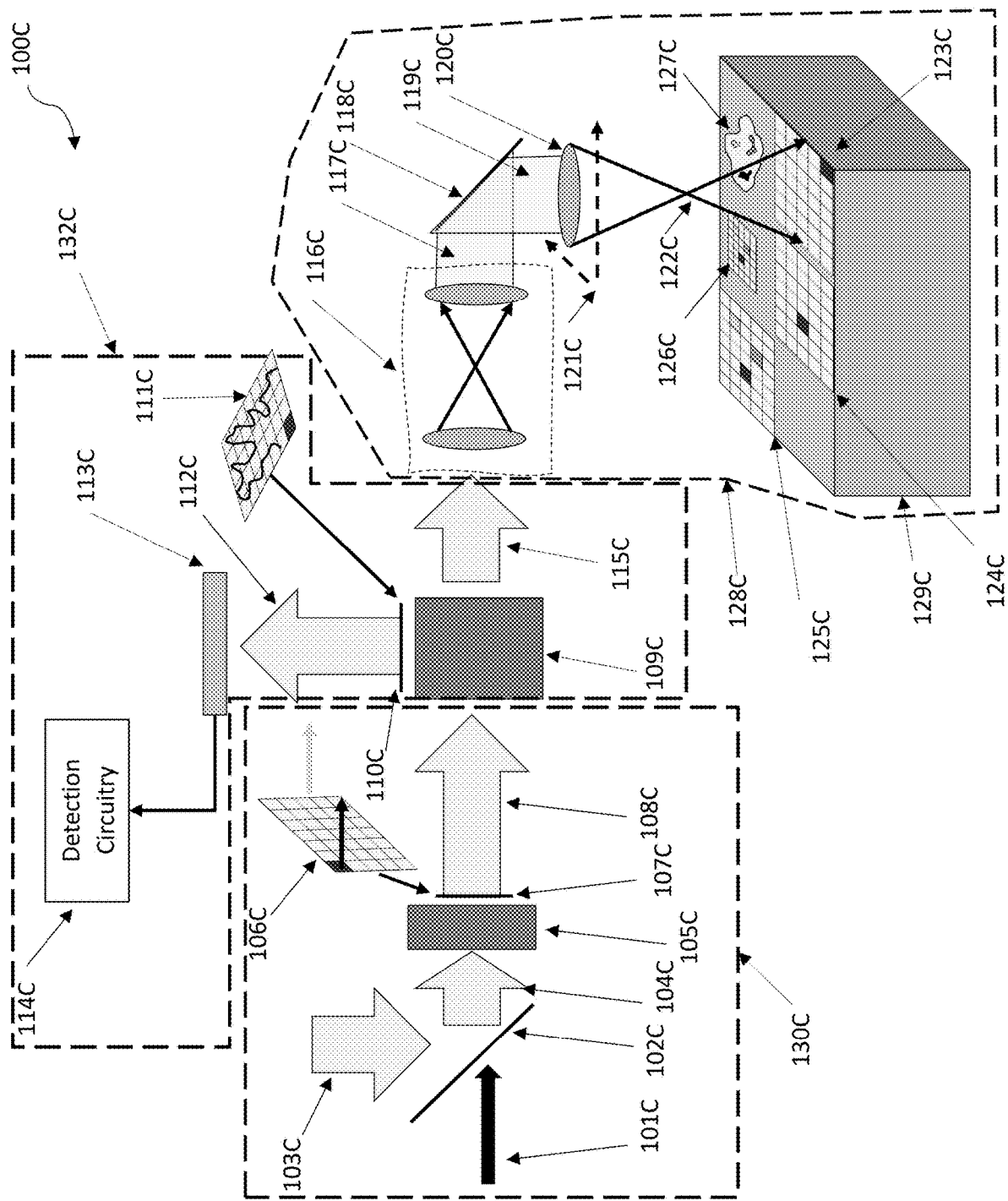
FIG. 1C illustrates one embodiment of a part defect testing system capable of operation similar to that described with respect to FIGS. 1A and 1B.

FIG. 1C illustrates one embodiment of a part defect testing system 100C capable of supported operation similar to that described with respect to FIGS. 1A and 1B. The system 100C includes a spatial conditioning assembly 130C to generate spatially patterned light of desired intensity, an interferometric imaging analysis assembly 132C, to measure surface movements, and an image transfer and scanning assembly 128C to direct laser light toward a PUT. In this embodiment, the spatial conditioning assembly 130C includes a microsecond 'hammer' laser 101C of wavelength λ1 is combined with a longer temporal pulsed (microsecond to millisecond) readout' laser 103C of wavelength λ2 by passing through and off (respectively) a dichroic combiner 102C. The combined beam 104C enters a SLM assembly 105C which contains a beam expander so that the combined beam is uniformly spread over an area that includes an optically addressed light valve/spatial light modulator. The SLM assembly 105C imposes an image onto combined hammer and readout beams 106C so that (as an example) one of the pixels contains the hammer and the rest of the image contains the readout beams. This spatially modulated beam 108C is injected into the interferometric imaging analysis assembly 132C. The assembly 132C includes an imaging Michelson interferometric assembly 109C which contains a beam splitter/combiner, reference mirror and other optics to allow the hammer and readout image 106C to be conveyed through this system with minimal spatial loss. A portion of the combined beam reflects off the reference mirror and is inserted into the detection side of the imaging Michelson interferometric assembly at image plane 110C. The rest of the combined beam travels through the Michelson interferometer and into the delivery beam 115C. The delivery beam 115C enters the image transfer and scanning assembly 128C. The assembly 128C includes imaging and transfer optics 116C that image the combined plane at 117C and place it onto the Part Under Test (PUT) 129C by way of turning mirror 118C. In some embodiments, a variable zoom lens assembly be used, with a zoom setting used so that a smaller or larger area can illuminated by the combined hammer and readout beams. In one embodiment, this allows the entire surface area of a PUT to be imaged without the need to scan and repeat. This is useful to allow a fast and coarse tomographical volume analysis in determine a rough estimate of pertinent volumes to be later examined at higher resolution or a cursory examination of PUT's density as two examples.

The combined image 117C leaves the imaging and transfer optics 116C and goes into a turning mirror 119C. The combined beam is imaged onto the PUT 129C by way of a F-theta lens 120C. The imaging system from the interferometry exit plane to the PUT 129C is shown as dotted assembly 128C. The image from 107C is now seen on the PUT at 123C with position defined hammer beam and readout beams. In this example arrangement 123C, the hammer beam occupies one of the image pixels of the overall image while one or more of the rest of the image are readout beams/channels. As another example shown in 124C, any of the pixels in the projected image can be the hammer while any of the other pixels can be readout channels/beams. As still another example shown in 125C, one or more of the pixels in the projected image can be hammer beams/channels while one or more of the rest of the projected image can be readout beams/channels. Another example is depicted in 126C in which the scale of the projected image can be enlarged or decreased (shown) in size with effective scaling of all the hammer and readout beams/channels; this attribute would be useful for increase resolution of the scanned volume. Additionally, because the SLM assembly 105C is not inherently pixelated, any arbitrary shape 127C of the overall pattern as well as that of each hammer and readout image can be achieved.

In operation, the system 100C of FIG. 1C induces an acoustic PUT response to the hammer beam that is captured by all the readout beams and travels back through the image relay optics and into the interferometer where it is re-imaged along with the referenced image at 110C. In this plane an image interferogram 111C is formed by the coherent mixing between the reference beam and the backward travelling readout beams encoded with phase information from the PUT. This image interferogram 112C is imaged onto a fast frame rate camera 113C in which each pixel can detect the phase variation change with reference to the temporally static reference image as a voltage change on a per pixel basis. The collection of voltage changes is transferred for processing in detection circuitry 114C where tomographical information of the PUT's acoustical response to the hammer(s) launched acoustical pulse(s) is rendered as a function of hammer attributes and location in relationship to the multitude of readout attributes and locations. Additional areas can be scanned by way of 2D linear motion 121C of the final imaging optics and mirror to any other portion of the PUT 129C.

Advantageously, since both the hammer and read-out channels can be adjusted in intensity, the strength of the launched acoustical wave (via the hammer) and the sensitivity of readout pick up can be independently adjusted to dial in ether sub-surface defects or volumetric defects. This attribute can be performed without any change to the PUT set-up. The intensity change affects the signal-to-noise ratio of the PUT's acoustical response.

Figure 1D:
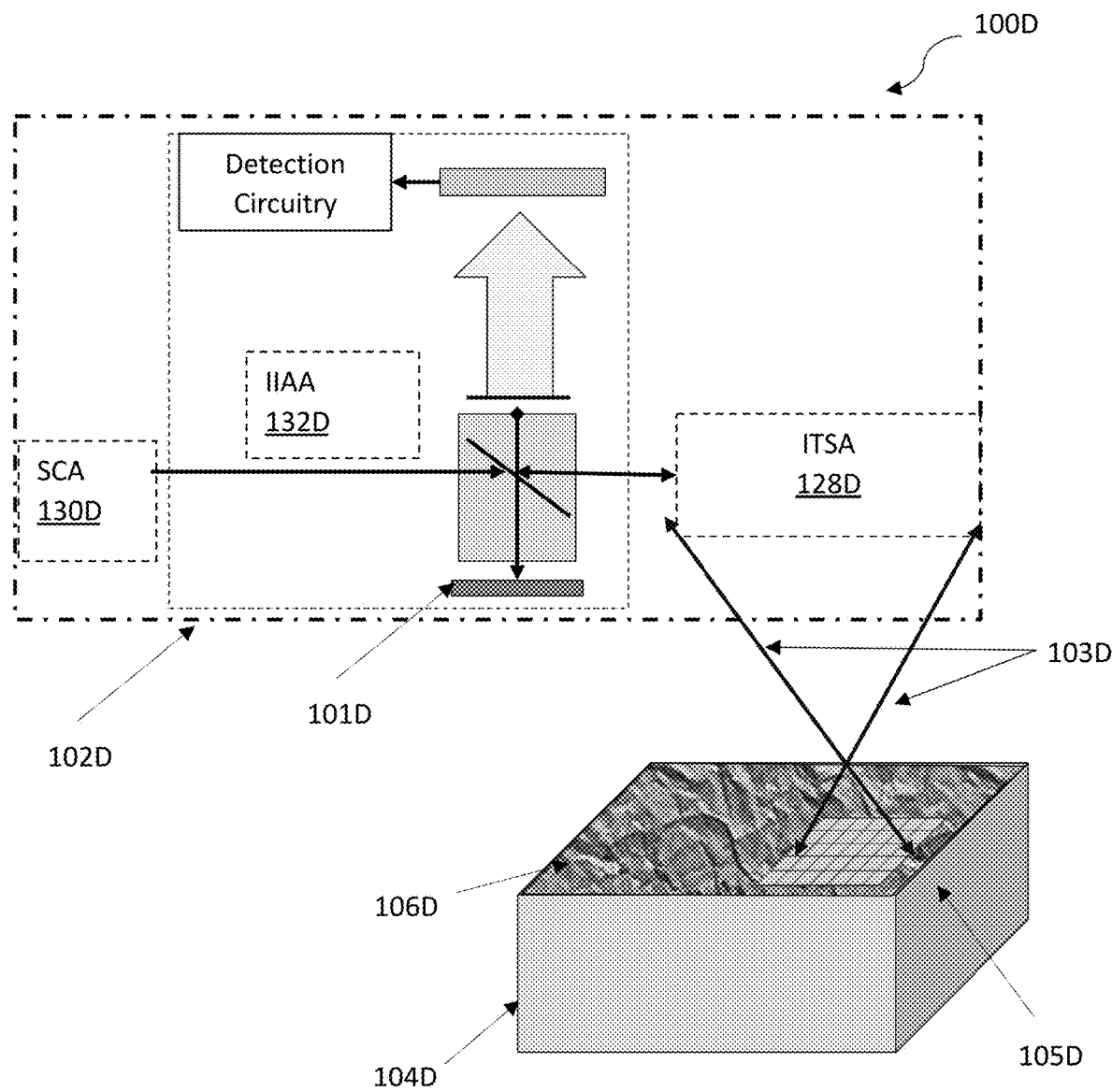
FIG. 1D illustrates an alternative embodiment of a part defect testing system that does not require use of a hammer channel laser.

FIG. 1D illustrates an alternative embodiment of a part defect testing system 100D that does not require use of a hammer channel laser. In this embodiment, the system 100D includes a includes a spatial conditioning assembly 130D to generate spatially patterned light of desired intensity, an interferometric imaging analysis assembly 132D to measure surface movements, and an image transfer and scanning assembly 128D to direct laser light toward a PUT 104D. A reference arm within the Interferometric Imaging Analysis Assembly (IIAA) 132D is replaced with a reflective phase light valve/spatial light modulator (LV/SLM) 101D. A reflective phase SLM 101D imposes a spatial phase onto the reference beam. The projected LUIS image 103D onto the PUT 104D contains readout beams 104D but no hammer. The surface of the PUT 104D in this example has a variable topological surface 106D. The variable surface imposes a phase change to the readout beams that might exceed the phase wrapping condition ($\lambda/2$ phase length) in which case under normal conditions, the fringes interferogram has an uncertainty as it relates to distance travelled. By replacing the reference mirror in the reference arm with a phase SLM, the phase wrapping can be prevented by spatially adjusting phase to the pixels in the reference side so that the contrast function of the interferogram in those pixels are maximized and the amount of wrapping can be ascertained along with their associated distance measurements.

Figure 1E:
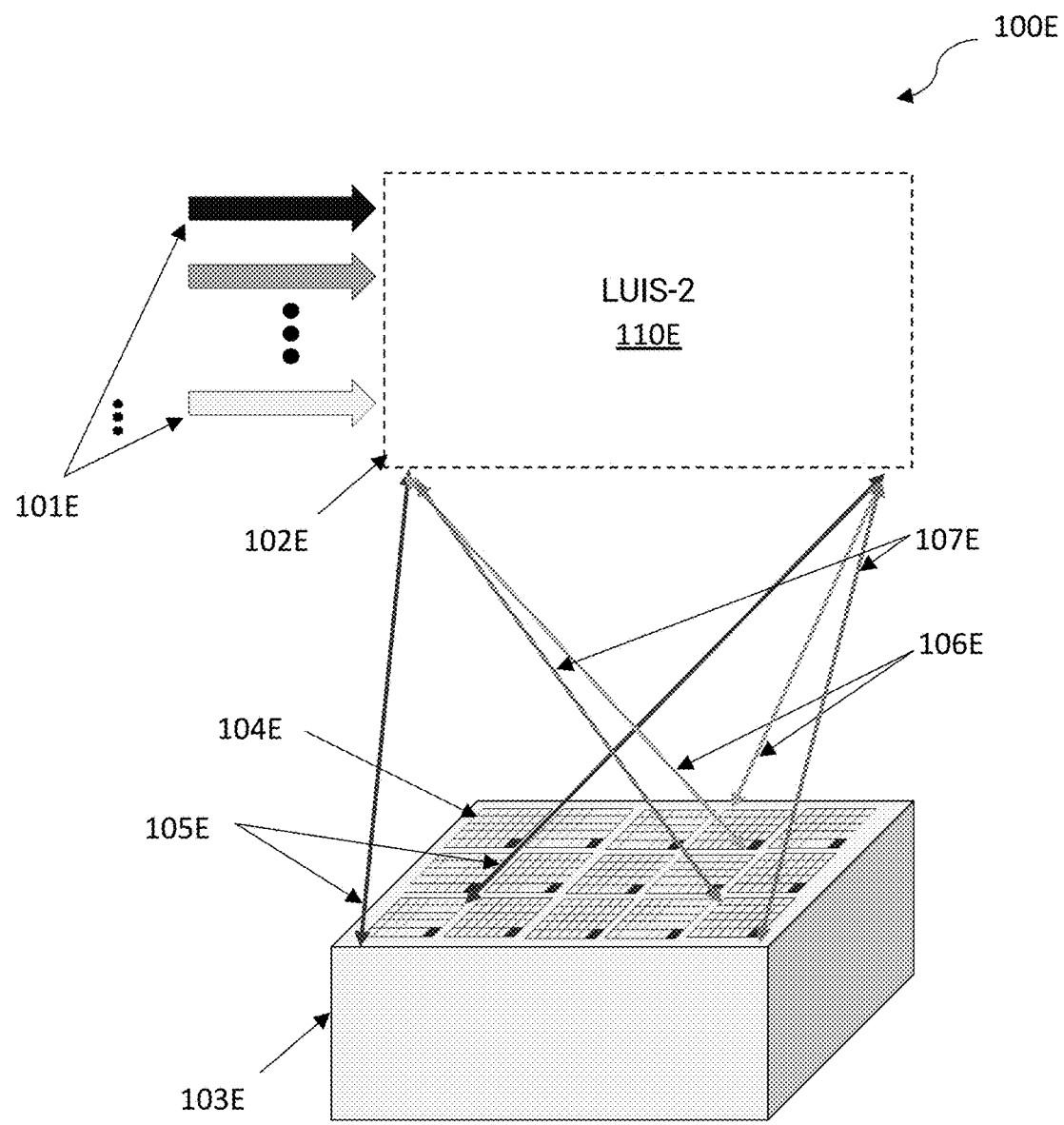
FIG. 1E illustrates an alternative embodiment of a part defect testing system that uses a hammer-readout pairing.

FIG. 1E illustrates an alternative embodiment of a part defect testing system 100E. A variety of lasers 101E at a variety of wavelengths are injected into laser ultrasonic imaging system LUIS-2 (110E). A hammer laser is paired with a readout laser of the same wavelength and are overlaid using polarization combining instead of wavelength combining. For each wavelength set that goes into LUIS-2 (110E), there is an initial combining in polarization to allow the image of the readouts to be combined with the image of the hammer laser. A wavelength combiner is then used to image combined each hammer-readout pairing to form a unified imaging beam. A diffractive optical element is included into the ITSA section so that the diffractive element dispersion will image split the according to wavelength (respectively 105E, 106E and 107E) into multiple images 104E over a much larger area on the PUT 103E than for a laser ultrasonic imaging system such as described with respect to the embodiment discussed with respect to FIG. 1C. Readout beams can combine back into one beam after passing through the diffractive element on the passage back to a Interferometric Imaging Analysis Assembly (IIAA) included in the LUIS-2 (110E). The phase difference associated with each wavelength can be adjusted using the phase reference light valve that replaces the reference mirror of a LUIS such as described in FIG. 1D. Advantageously, this combination allows for larger area of a PUT 103E to be investigated without the need for scanning at the expense of computation and phase adjustments.

In an embodiment related to that discussed with respect to FIG. 1E, wavelength multiplexing can be used to operate through a same SLM and camera system. This embodiment relies on use of a dispersive image relay to separate the wavelength images out in space and is fitted with a broad area tunable filter preceding the high-speed camera. The dispersive element in the image relay section spatially separates the wavelengths so that they are tiled across the PUT with each tile containing the same resolution as a single projected image. Each tile is spatially separated from other tiles across the PUT. The readout channels at a wavelength comes back through the relay dispersive optics and is folded back into a coaxial response that goes into the highspeed camera. In another embodiment, each hammer wavelength source is activated in concert with the LUIS SLM so that its portion of the illuminated part gets probed according to the above description. In another embodiment the number of read-out and hammer channels can be independent, as is their locations within any one tile across all projected tiles. This allows hammer wavelengths to be activated at once but slightly separated in time. In another embodiment, a tunable wavelength area filter can be placed in the highspeed image plane and synchronized with the camera to separate ultrasonic pulses caused by a hammer of a specific wavelength. This embodiment would direct identical read-out and hammer channels to LUIS imaged tiles on the PUT.

Figure 1F:
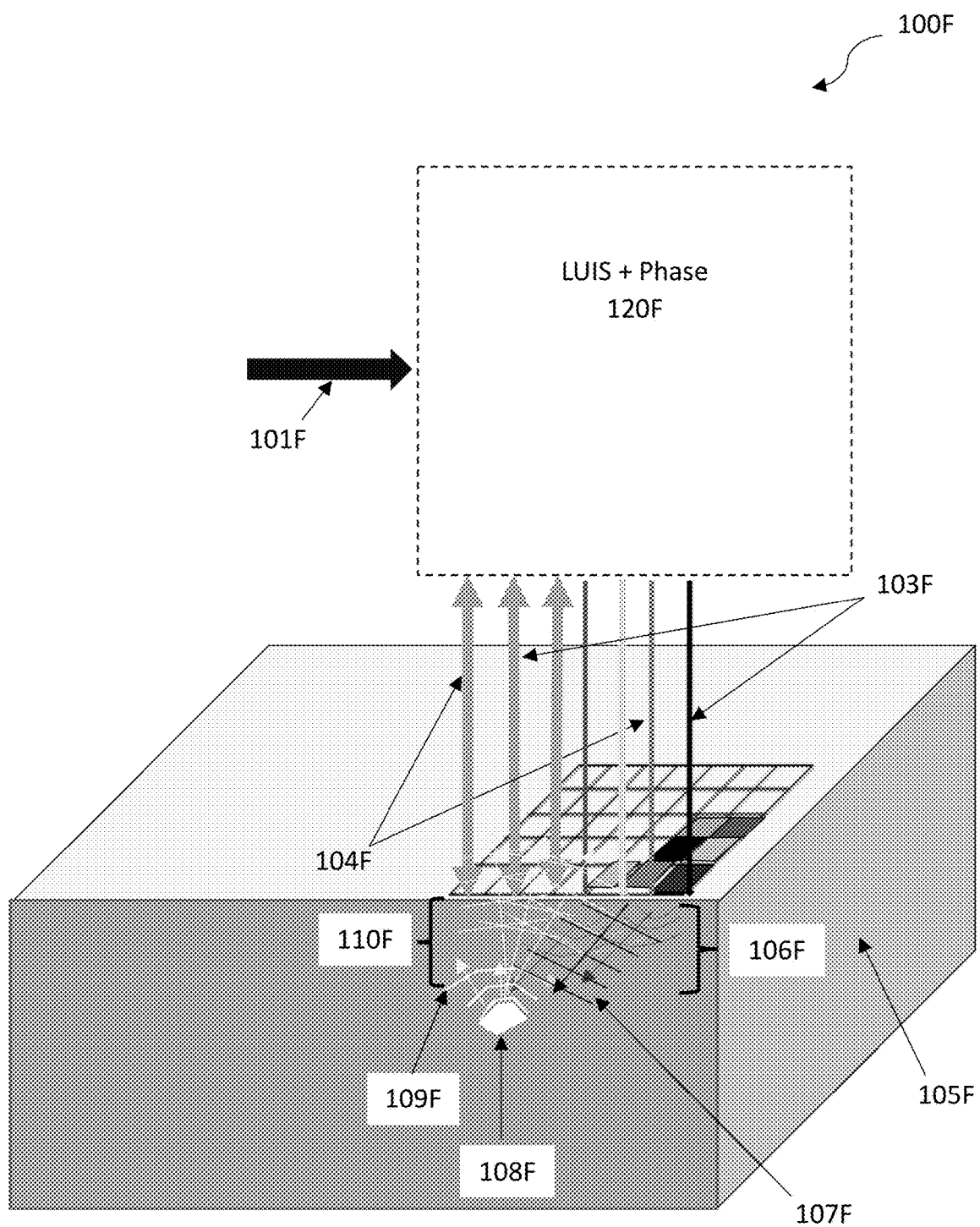
FIG. 1F illustrates an alternative embodiment of a part defect testing system that supports optical phase control.

FIG. 1F illustrates an alternative embodiment of a part defect testing system 100F. Inclusion of optical phase control (Phase SLM) in a LUIS with phase system 120F allows for coherent acoustical control of launched acoustical field. In this variant of LUIS, LUIS laser sources 101F are inputs to LUIS 120F which includes a phase SLM in the path of the hammer laser source. The projection of the readout 104F and hammer 103F beams would include a phasing impressed on the hammer beams 103F so that when the acoustical waves are launched into the PUT 105F there is coherent interference in the acoustical response which would allow directional control 106F over the acoustical field. This control would allow defects and volumes of interested to be interrogated with higher concentration 107F of acoustical energy than normally. The defect 108F would respond normally and produce acoustic response (109F and 110F) that is sensed by the readout beams 104F. In some embodiments a phasor relationship in the hammer beams can be modified so that the resulting acoustical field launched can be spatially scanned, enhancing the resolution and speed which the volume can be imaged. Another embodiment initially determines an acoustic signature of the PUT 105F volume and applies an adaptive optics algorithm to negate certain aspects of the acoustic response so as to better improve resolution, scanning capabilities or isolate interesting phenomena without the need for repositioning the part of redirecting LUIS to another section of the PUT 105F. An aspect of this embodiment may allow for sensing of gray scale changes in the PUT's volume due to grain boundaries and directional stress structures within the PUT's volume.

Figure 1G:
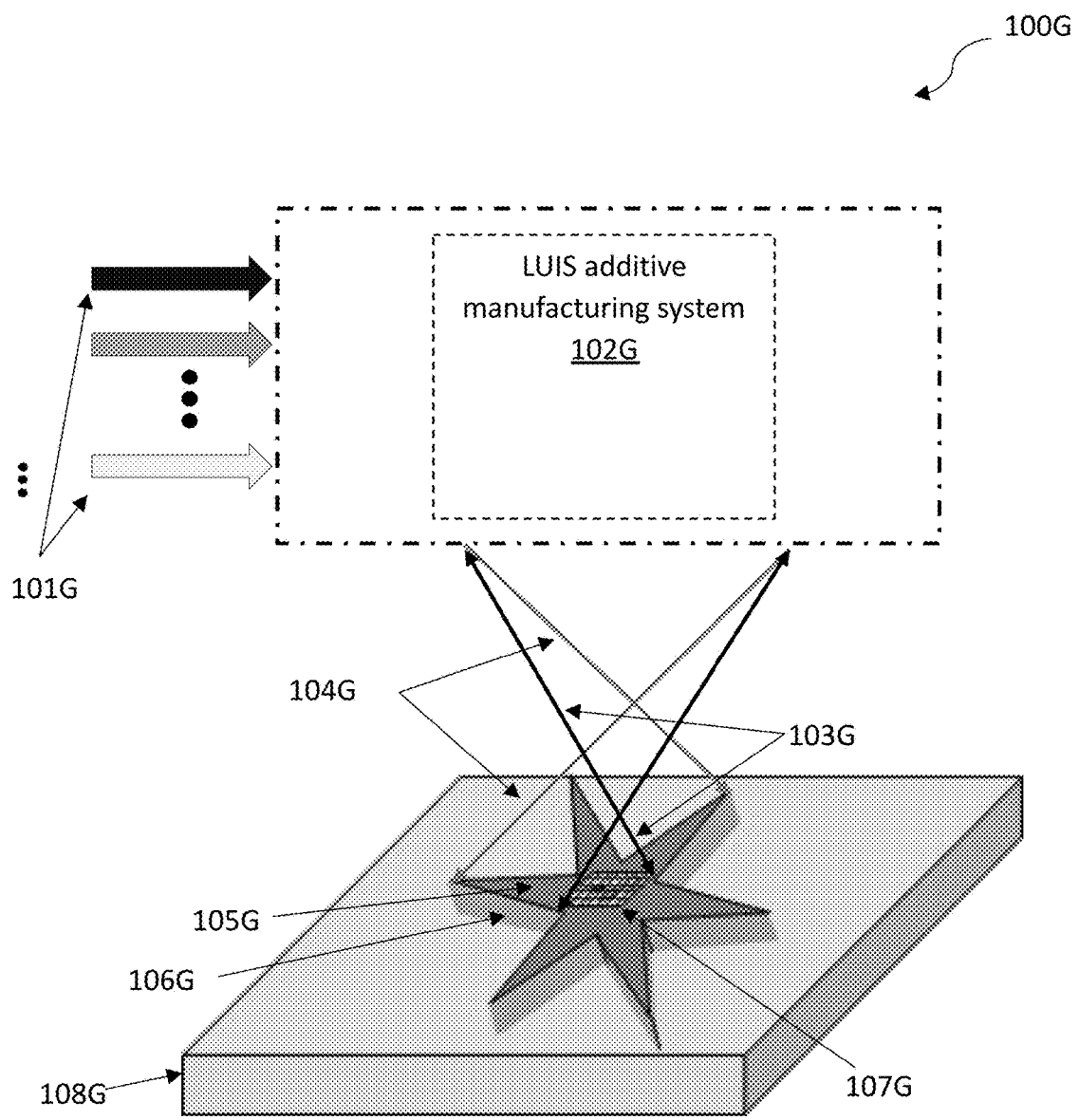
FIG. 1G illustrates an example of a LUIS equipped additive manufacturing system.

FIG. 1G illustrates an example of an application of a LUIS. In this embodiment, a LUIS equipped additive manufacturing system 100G is used to both provide energy for additive manufacturing and for layer by layer testing of a PUT 106G. In this embodiment, a multitude of optical sources 101G are injected into the LUIS 102G. Diagnostic LUIS can be patterned either simultaneously or separately from an additive writing system, with the diagnostic and write beams 103G combined and imaged onto the PUT 106G (e.g. as projected image array 107G). In this example, the LUIS 102G projected image 107G is directed toward print layer 105G on a print plate 108G that is being printed using laser beams 104G. The LUIS 102G can sample the printed layer 105G in real time to determine the effects to the underlying prior layers of printed materials and identify issues with defects or surface topography. In this application, both the liquid and non-liquid states of the current print can be sampled along with attributes of how the prior print layers are being affected by the current printing state. Additionally, desired attributes within the melt region can be attained by imposing a secondary hammering operation based on initial LUIS measurement state.

Figure 2:
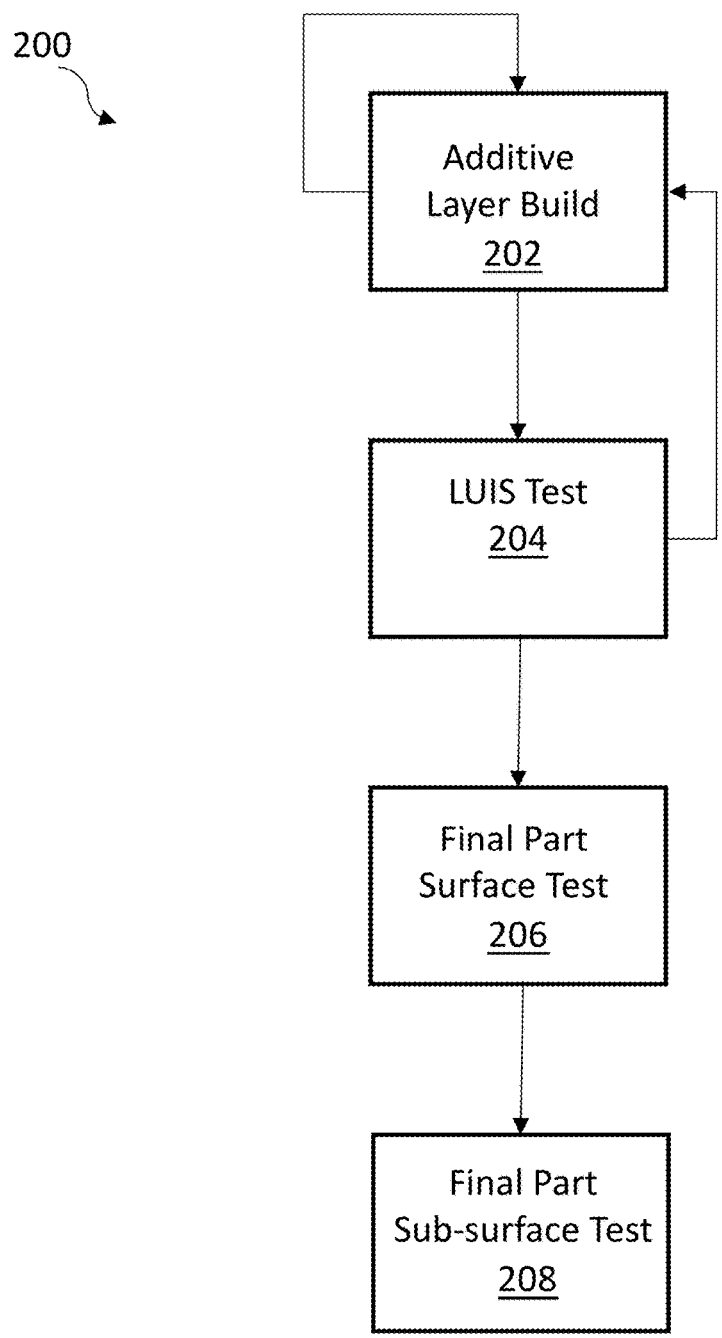
FIG. 2 a portion of an additive manufacturing flow chart.

FIG. 2 illustrates a portion of an additive manufacturing flow chart 200. An additive layer build 202 can be repeated as needed to form a testable part. As needed, after each layer is manufactured, or alternatively, after multiple layers are formed, a LUIS test 204 can be used to map surface irregularities or detect sub-surface part defects. Based on that information, modifications to the additive layer build 202 can be made, or the part reworked or discarded. After the part is finished, a final part surface test 206 and/or a final part sub-surface test 208 can be made. In some embodiments, surface and sub-surface testing can be conducted sequentially, while in other embodiments testing can proceed at substantially the same time, since surface and bulk acoustic waves can be distinguished by a suitably configured LUIS.

In some embodiments of the additive manufacturing flow chart 200, LUIS can be used as a diagnostic/control/adjustment for parts during printing. In this application, LUIS interrogates a layer that is being printed. In one embodiment, LUIS interrogates the area being printed and algorithms determine if there are correctable defects and then directs the laser print system to adjust printing parameters according to correct the defects. Defects that can be identified are grain growth and direction, intentional stress field and direction, desired and undesired crystalline phases and delamination (to name a few). In another embodiment, LUIS interrogates the volume on which the printing is taking place and the algorithms determine if the volume beneath the printed area is as it should be or is defective. This can be a corrective action (to increase bed temperature to anneal the part better) or as a gate for this print. In another embodiment, LUIS interrogates the melt zone during the print for crystalline grain size and the algorithm direct the hammer function of LUIS to launch higher or lower frequency ultrasound into the melt pool of the print to control the grain size and distribution.

As noted, LUIS can be used for surface profiling (206) and sub-surface defect profiling (208). Even if a LUIS hammer channel is not activated, the LUIS system can be used as a machine vision like system with full capabilities to interrogate the PUT's surfaces. The interferometric image seen would be the static variance with respect to a flat surface, i.e. surface features. This function would be likely to be performed initially to eliminate the surface function to form the PUT's baseline, but this data can used to map this first interface. The illumination of the surface would be performed through the read-out channels, where the hammer channel has been turned off and only the read-out channels are active.

When a hammer channel is available, it can be activated for measuring surface features with the hammer intensity reduced. When the hammer pulse strikes the surface of a volume, two primary waves are excited into the volume, a fast surface wave and a slower bulk wave. Since the surface wave contains higher frequencies and arrives at the read-out locations faster than the bulk waves thus by deconvolving the frequency spectrum in the interferogram, these two types of waves can be individually measured. In the situation where the surface defects are to be measured, the hammer intensity is reduced so that the surface wave is excited while the bulk wave is reduced to insignificance. An interferogram camera in a LUIS would see a surface undulation as a static fringe structure punctuated by variations on these striations due to surface and sub-surface defects. The intensity of the read-out channels can be adjusted so that the bulk waves are below a threshold.

Another embodiment that can be used is based on intensity adjustment of hammer and read-out channels. Size and resolution of detectable sub-surface defects or volumetric defects can be adjusted by increasing or decreasing the intensity of the read-out channels. This attribute can be performed without any change to the PUT set-up. The intensity change affects the signal-to-noise ratio of the PUT's ultra-sonic response. Additionally, since the read-out channels can take on any intensity profile or pattern, a spatial fringe structure can be played across the surface with the fringe be static or dynamic and with or without hammer channel(s). This attribute of the LUIS system would allow the surface to be mapped with high detail. Advantageously, the addition of hammer channels allows use of surface profiling methods with sub-surface and bulk methods afforded by laser based ultra-sonics.

Figure 3:
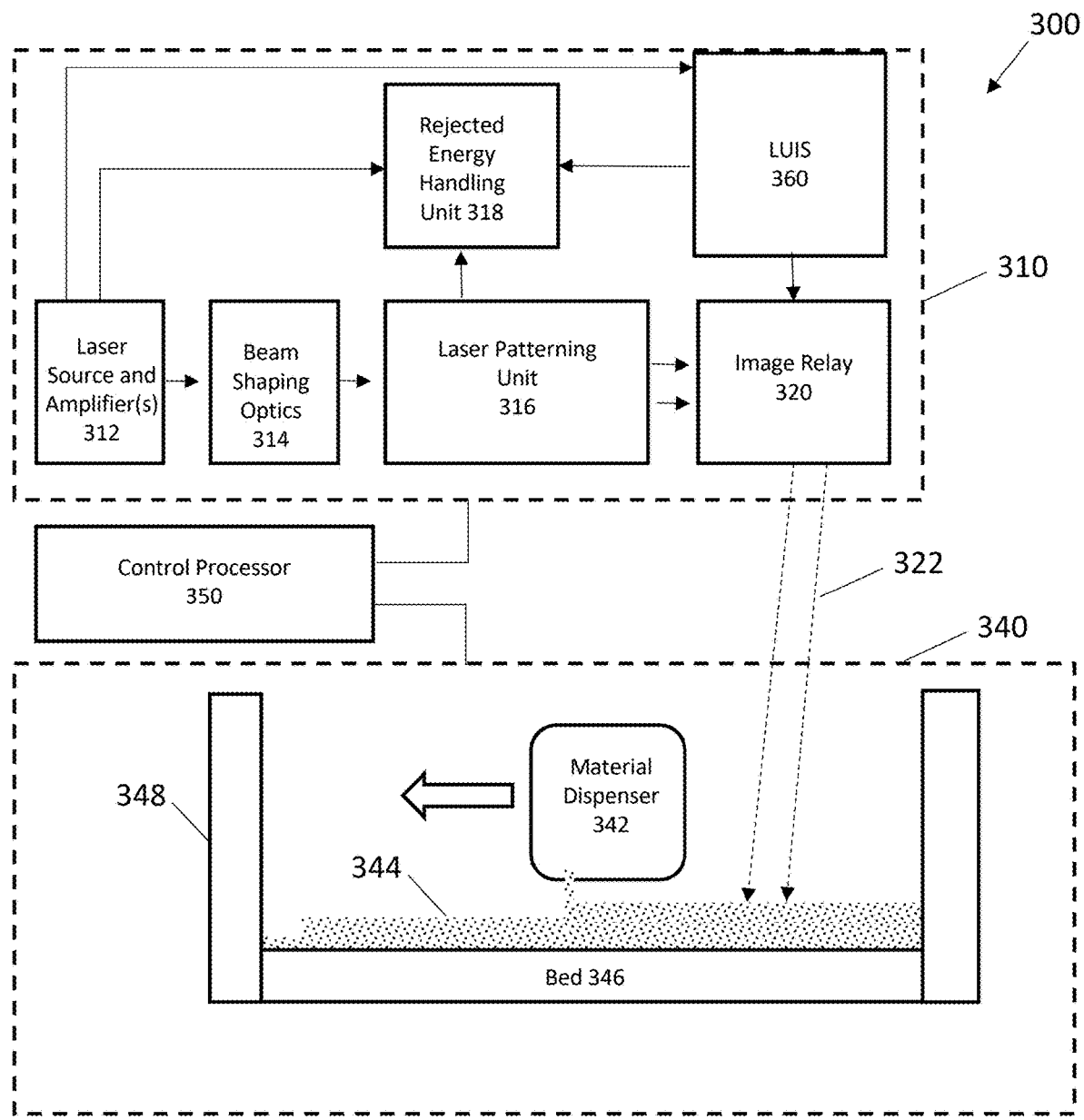
FIG. 3 illustrates an additive manufacturing method and system with a contained LUIS.

FIG. 3 illustrates an additive manufacturing method and system 300 that supports a LUIS 360 for layer by layer and finished part testing. As seen in FIG. 3, a laser source and amplifier(s) 312 can include cooled laser amplifiers and other components. The additive manufacturing system 300 uses lasers able to provide one or two dimensional directed energy as part of a laser patterning system 310 and to the LUIS 360. In some embodiments, one dimensional patterning can be directed as linear or curved strips, as rastered lines, as spiral lines, or in any other suitable form. Two dimensional patterning can include separated or overlapping tiles, or images with variations in laser intensity. Two dimensional image patterns having non-square boundaries can be used, overlapping or interpenetrating images can be used, and images can be provided by two or more energy patterning systems. The laser patterning system 310 uses laser source and amplifier(s) 312 to direct one or more continuous or intermittent energy beam(s) toward beam shaping optics 314. After shaping, if necessary, the beam is patterned by a laser patterning unit 316, with generally some energy being directed to a rejected energy handling unit 318. Patterned energy is relayed by image relay 320 toward an article processing unit 340, in one embodiment as a two-dimensional image 322 focused near a bed 346. The bed 346 (with optional walls 348) can form a chamber containing material 344 (e.g. a metal powder) dispensed by material dispenser 342. Patterned energy, directed by the image relay 320, can melt, fuse, sinter, amalgamate, change crystal structure, influence stress patterns, or otherwise chemically or physically modify the dispensed material 344 to form structures with desired properties. A control processor 350 can be connected to variety of sensors, actuators, heating or cooling systems, monitors, and controllers to coordinate operation of the laser source and amplifier(s) 312, beam shaping optics 314, laser patterning unit 316, and image relay 320, as well as any other component of system 300. The control processor 350 can be a single central controller, or alternatively, can include one or more independent control systems. As will be appreciated, connections can be wired or wireless, continuous or intermittent, and include capability for feedback (for example, thermal heating can be adjusted in response to sensed temperature).

In some embodiments, beam shaping optics 314 can include a great variety of imaging optics to combine, focus, diverge, reflect, refract, homogenize, adjust intensity, adjust frequency, or otherwise shape and direct one or more laser beams received from the laser source and amplifier(s) 312 toward the laser patterning unit 316. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Laser patterning unit 316 can include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 318 is used to disperse, redirect, or utilize energy not patterned and passed through the image relay 320. In one embodiment, the rejected energy handling unit 318 can include passive or active cooling elements that remove heat from both the laser source and amplifier(s) 312 and the laser patterning unit 316. In other embodiments, the rejected energy handling unit can include a "beam dump" to absorb and convert to heat any beam energy not used in defining the laser pattern. In still other embodiments, rejected laser beam energy can be recycled using beam shaping optics 314. Alternatively, or in addition, rejected beam energy can be directed to the article processing unit 340 for heating or further patterning. In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system may be utilized in, for example and not limited to, laser-based additive manufacturing techniques where a mask is applied to the light. Advantageously, in various embodiments in accordance with the present disclosure, the thrown-away energy may be recycled in either a homogenized form or as a patterned light that is used to maintain high power efficiency or high throughput rates. Moreover, the thrown-away energy can be recycled and reused to increase intensity to print more difficult materials.

Image relay 320 can receive a patterned image (either one or two-dimensional) from the laser patterning unit 316 directly or through a switchyard and guide it toward the article processing unit 340. In a manner similar to beam shaping optics 314, the image relay 320 can include optics to combine, focus, diverge, reflect, refract, adjust intensity, adjust frequency, or otherwise shape and direct the patterned light. Patterned light can be directed using movable mirrors, prisms, diffractive optical elements, or solid state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 340 is substantially equivalent to the image distance. In effect, this enables a quick change in the optical beam delivery size and intensity across locations of a build area for different materials while ensuring high availability of the system.

Article processing unit 340 can include a walled chamber 348 and bed 344 (collectively defining a build chamber), and a material dispenser 342 for distributing material. The material dispenser 342 can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 346.

In addition to material handling components, the article processing unit 340 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, 1-$C_4H_{10}$, 1-$C_4H_8$, cic-2,$C_4H_7$, 1,3-$C_4H_6$, 1,2-$C_4H_6$, $C_5H_{12}$, n-$C_5H_{12}$, i-$C_5H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, C16H34, C6H6, $C_6H_5$-$CH_3$, $C_8H_{10}$, $C_2H_5OH$, $CH_3OH$, $iC_4H_8$. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used.

In certain embodiments, a plurality of article processing units or build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls. In still other embodiments, a build chamber can be configured as a removable printer cartridge positionable near laser optics. In some embodiments a removable printer cartridge can include powder or support detachable connections to a powder supply. After manufacture of an item, a removable printer cartridge can be removed and replaced with a fresh printer cartridge.

In another embodiment, one or more article processing units or build chambers can have a build chamber that is maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the ever changing mass of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or build chambers with a build platform that supports a powder bed capable of tilting, inverting, and shaking to separate the powder bed substantially from the build platform in a hopper. The powdered material forming the powder bed may be collected in a hopper for reuse in later print jobs. The powder collecting process may be automated, and vacuuming or gas jet systems also used to aid powder dislodgement and removal.

Some embodiments, the additive manufacturing system can be configured to easily handle parts longer than an available build chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having an article processing units or build chamber contained within an enclosure, the build chamber being able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Control processor 350 can be connected to control any components of additive manufacturing system 300 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 350 is provided with an interface to allow input of manufacturing instructions. Use of a wide range of sensors allows various feedback control mechanisms that improve quality, manufacturing throughput, and energy efficiency.

Figure 4:
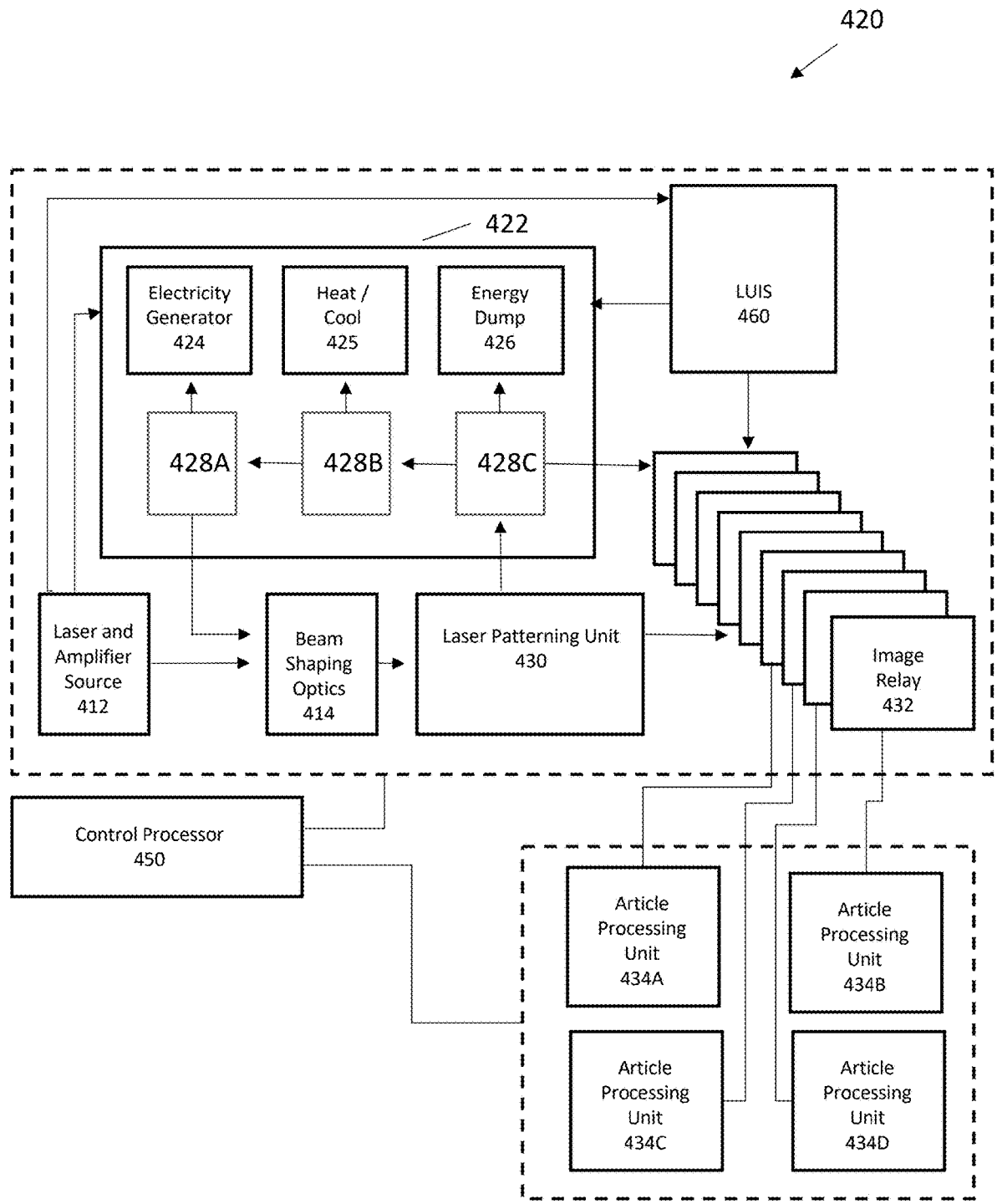
FIG. 4 illustrates one embodiment of an additive manufacturing system that includes a switchyard system enabling reuse of patterned two-dimensional energy, excess heat, and further includes a LUIS.

FIG. 4 illustrates one embodiment of an additive manufacturing system that includes a switchyard system enabling reuse of patterned two-dimensional energy, excess heat, and further includes a LUIS 460 for parts testing. In one embodiment an additive manufacturing system 420 has an energy patterning system with a laser and amplifier source 412 that can direct one or more continuous or intermittent laser beam(s) toward beam shaping optics 414 and the LUIS module 460. Similar to control processor 350 of FIG. 3, a suitable control processor 450 can be connected to control any components of additive manufacturing system 420 described herein, including lasers, laser amplifiers, optics, heat control, build chambers, and manipulator devices. Excess heat from system modules or components, including the laser and amplifier source 412 and the LUIS 460, can be transferred into a rejected energy handling unit 422. After shaping, the beam is two-dimensionally patterned by an energy patterning unit 430, with generally some energy being directed to the rejected energy handling unit 422. Patterned energy is relayed by one of multiple image relays 432 toward one or more article processing units 434A, 434B, 434C, or 434D, typically as a two-dimensional image focused near a movable or fixed height bed. The bed be inside a cartridge that includes a powder hopper or similar material dispenser. Patterned laser beams, directed by the image relays 432, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Coolant fluid from the laser amplifier and source 412 can be directed into one or more of an electricity generator 424, a heat/cool thermal management system 425, or an energy dump 426. Additionally, relays 428A, 428B, and 42C can respectively transfer energy to the electricity generator 424, the heat/cool thermal management system 425, or the energy dump 426. Optionally, relay 428C can direct patterned energy into the image relay 432 for further processing. In other embodiments, patterned energy can be directed by relay 428C, to relay 428B and 428A for insertion into the laser beam(s) provided by laser and amplifier source 412. Reuse of patterned images is also possible using image relay 432. Images can be redirected, inverted, mirrored, sub-patterned, or otherwise transformed for distribution to one or more article processing units 434A-D. Advantageously, reuse of the patterned light can improve energy efficiency of the additive manufacturing process, and in some cases improve energy intensity directed at a bed or reduce manufacture time.

A LUIS and/or additive manufacturing system used in the described embodiments can be connected to a control processor that can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The controller can be a single central controller, or alternatively, can include one or more independent control systems. The controller can provided with an interface to allow input of instructions. Use of a wide range of sensors allows various feedback control mechanisms that improve quality, manufacturing throughput, and energy efficiency.

In some embodiments, the laser sources can be constructed as a continuous or pulsed laser. In other embodiments the laser source includes a pulse electrical signal source such as an arbitrary waveform generator or equivalent acting on a continuous-laser-source such as a laser diode. In some embodiments this could also be accomplished via a fiber laser or fiber launched laser source which is then modulated by an acousto-optic or electro optic modulator. In some embodiments a high repetition rate pulsed source which uses a Pockels cell can be used to create an arbitrary length pulse train.

Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/$MnC_{12}$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:$YVO_4$) laser, Neodymium doped yttrium calcium oxoborateNd:$YCa_4O(BO_3)_3$ or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:$2O_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass ($147Pm^{+3}$:Glass) solid-state laser, Chromium doped chrysoberyl (alexandrite) laser, Erbium doped and erbium-ytterbium co-doped glass lasers, Trivalent uranium doped calcium fluoride (U:$CaF_2$) solid-state laser, Divalent samarium doped calcium fluoride(Sm:$CaF_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

In some embodiments, power amplifiers with gain media can be used in conjunctions with the lasers. A gain medium for a laser amplifier can be based on Neodymium, Ytterbium, or Erbium doped rods or slabs of materials such as Y3AL5O12 (YAG), YLiF4 (YLF), YVO4, glass, GdVO4, Gd3Ga5O12 (GGG), KGd(WO4)2 (KGW), YAlO3 (YALO), YAlO3 (YAP), LaSc3(BO3)4 (LSB), Sr5(PO4)3F (S-FAP), or Lu2O3, Y2O3.

The laser beam can be shaped by a great variety of laser optics to combine, focus, diverge, reflect, refract, homogenize, adjust intensity, adjust frequency, or otherwise shape and direct one or more laser beams. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An additive manufacturing method comprising:
conducting a layer test on a part comprising one or more layers, the layer test comprising:
generating a two-dimensional patterned beam comprising a hammer channel having a first wavelength and a plurality of read-out channels having a second wavelength;
directing the two-dimensional patterned beam toward a layer on the part to provide an acoustic hammer pulse using the hammer channel to induce surface movement of the part, and
reading a response to the plurality of read-out channels based on the surface movement of the part;
adding a layer to the part by performing a corrective action based on the response; and
repeating the layer test.

2. The additive manufacturing method of claim 1, wherein the two-dimensional pattern beam is generated by an additive writing system and laser ultrasonic imaging system (LUIS).

3. The additive manufacturing method of claim 1, wherein an additive writing system performing the additive manufacturing method shares at least some laser light beams with a laser ultrasonic imaging system (LUIS).

4. The additive manufacturing method of claim 1, further comprising identifying sub-surface defects using the layer test.

5. The additive manufacturing method of claim 1, further comprising mapping surface topography using the layer test.

6. The additive manufacturing method of claim 1, further comprising simultaneously identifying sub-surface defects and mapping surface topography using the layer test.

7. The additive manufacturing method of claim 1, wherein the corrective action comprises adjusting a powder bed temperature for annealing the part.

8. The additive manufacturing method of claim 1, further comprising correcting defects based on information from the layer test and using the hammer beam to direct ultrasound energy into a melt pool to control at least one of grain size and grain distribution.

9. An additive manufacturing system, comprising:
an addressable light patterning unit to receive a light beam and emit light as a two-dimensional patterned beam;
a laser ultrasonic imaging system (LUIS) that generates a hammer beam having a first wavelength and a plurality of read-out beams having a second wavelength, wherein the hammer beam and the read-out beams are arranged in a two-dimensional pattern; and
an image relay to receive the two-dimensional patterned beam and focus it as a two-dimensional image on a part being additively manufactured on a powder bed and to relay a response to the plurality of read-out beams to an interferometer, the response generated based on surface movement of the part induced by the hammer beam.

10. The additive manufacturing system of claim 9, wherein the addressable light patterning unit comprises a transmissive spatial light modulator.

11. The additive manufacturing system of claim 9, wherein the addressable light patterning unit comprises a reflective spatial light modulator.

12. The additive manufacturing system of claim 9, wherein addressable light patterning unit modulator comprises an optically addressed light valve.

13. An additive manufacturing system, comprising:
a beam patterning unit to generate a first two-dimensional patterned laser beam from a laser beam;
a plurality of beam switching units to direct two-dimensional patterned energy beams;
a plurality of beam steering units to receive and direct the first two-dimensional patterned laser beam;
a laser ultrasonic imaging system (LUIS) that generates a hammer beam using laser light having a first wavelength and a read-out beam using laser light having a second wavelength
at least one powder bed to receive at least a portion of the directed two-dimensional patterned laser beam from at least one of the plurality of energy steering units and also receive a second two-dimensional pattern laser beam comprising a hammer channel based on the generated hammer beam and a plurality of read-out channels based on the generated read-out beam,
wherein the hammer channel is configured to induce a surface movement at a part being additively manufactured at the powder bed and the plurality of read-out channels is configured to generate a response from the part based on the induced surface movement.

14. An additive manufacturing system, comprising:
an additive writing system capable of forming a part; and
a laser ultrasonic imaging system (LUIS) that generates a two-dimensional patterned beam comprising a hammer channel having a first wavelength and a plurality of read-out channels having a second wavelength, the two-dimensional patterned beam being directed against the part,
wherein the hammer channel is configured to induce a surface movement at the part and the plurality of read-out channels is configured to generate a response from the part based on the induced surface movement.

* * * * *